US006443577B1

(12) United States Patent
Baldwin

(10) Patent No.: US 6,443,577 B1
(45) Date of Patent: Sep. 3, 2002

(54) OVERHEAD PROJECTION HAVING A FRICTION SECURED ADJUSTABLE CANTILEVERED HEAD

(75) Inventor: Dwight G. Baldwin, Austin, TX (US)

(73) Assignee: 3M Innovative Properties Company, St. Paul, MN (US)

(*) Notice: Subject to any disclaimer, the term of this patent is extended or adjusted under 35 U.S.C. 154(b) by 24 days.

(21) Appl. No.: 09/738,073

(22) Filed: Dec. 15, 2000

(51) Int. Cl.⁷ .................................................. G03B 21/14
(52) U.S. Cl. ................................. 353/100; 353/DIG. 6
(58) Field of Search ........................... 353/DIG. 3, 119, 353/100, 101, DIG. 6, DIG. 4, 63, 65, 66, 122

(56) References Cited

U.S. PATENT DOCUMENTS

| 3,148,853 A | | 9/1964 | Field |
| 4,097,144 A | | 6/1978 | Prochnow |
| 4,634,246 A | * | 1/1987 | Dreyer, Jr. .................. 353/98 |
| 4,795,252 A | * | 1/1989 | Kyhl .......................... 353/122 |
| 5,245,370 A | | 9/1993 | Peterson ..................... 353/122 |
| 5,465,127 A | | 11/1995 | Baldwin |

FOREIGN PATENT DOCUMENTS

| JP | 59065945 | 4/1984 |
| JP | 60131509 | 7/1985 |
| JP | 60131510 | 7/1985 |
| JP | 60203907 | 10/1985 |
| JP | 04133201 | 5/1992 |
| JP | 06118505 | 4/1994 |
| JP | 06208169 | 7/1994 |
| JP | 08077585 | 3/1996 |

* cited by examiner

Primary Examiner—William Dowling
(74) Attorney, Agent, or Firm—Yen Tong Florczak

(57) ABSTRACT

An overhead projector including a stage assembly, a post extending from the stage assembly and an optical projection head assembly suspended above the stage assembly by the post in a cantilever arrangement, the optical head assembly having a weight W. The head assembly includes a post retaining assembly having a collar fitted around the post, the collar having at least two friction points interacting with the post, the interaction having a coefficient of friction $\mu$. The weight W and the cantilever arrangement create torsional forces, the at least two friction points being positioned to transmit the torsional forces onto the post creating a friction force $F_f$. The coefficient of friction of the interaction between each of the at least two friction points and the post is selected such that absent other forces the friction force is at least sufficient to maintain the head assembly at a static position with respect to the post.

18 Claims, 9 Drawing Sheets

OVERHEAD PROJECTION HAVING A FRICTION SECURED ADJUSTABLE CANTILEVERED HEAD

BACKGROUND OF THE INVENTION

The present invention relates to overhead projectors (OHP). In particular, the present invention relates to an OHP having an adjustable cantilevered head having a friction-controlled position adjustment mechanism. The cantilevered projection head design of the present invention provides sufficient force on friction pads to support the arm/head assembly. A spring-loaded pad is added only to prevent chatter of the arm/head assembly during user adjustment.

Overhead projectors project a transparency placed on a stage onto a screen. Traditional overhead projectors generally include a lighted horizontal stage and a projection head including optical components suspended above the stage by an arm coupled to a vertical post. The projection stage generally includes further optical components, such as a Fresnel lens. The distance between the projection head and the stage controls the focus of the projected image by controlling the distance between optical components on the head and on the stage.

As most overhead projectors are not consistently placed at the same fixed distance from the screen, the projection head/arm assembly has a range of travel along the post. Both gross control and fine head position control are required, first to move the head to a general position and then to tune the sharpness of the focus on the screen. Once the image focus is tuned, the projector head should remain in the exact registration chosen.

Different overhead projectors use a variety of mechanisms for providing both the gross and fine position control required. A basic OHP design uses a pin and cavity, or other interactive locking arrangement, to lock the head along one of various predetermined stop positions along the post. While this method offers rapid gross adjustment, fine tuning is limited due to the finite number of predetermined stops.

Other OHP designs, such as a 3M model 9050 OHP, use a spring loaded mount design that relies on friction pads. This type of design is discussed in U.S. Pat. No. 5,245,370, assigned to Minnesota Mining and Manufacturing Co. FIG. 1 generally illustrates the retention mechanism of this design, which will be referred to as the two-spring design. The design 10 includes a post 12 and an arm 14. The proximal end of arm 14 includes collar 16, a hollow casing that fits around the post 12. The combined weight of the head (not shown) and of the arm assembly is illustrated as a single force W placed at the center of mass. Inside the collar 16, four friction points 20, 22, 24, and 26, retain the arm 14 onto the post 12. In reality, each friction point may include one or more pads. The present text illustrates friction points that represent the summation of the forces applied at that point.

The two-spring design is advantageous because the head/arm assembly may be placed at any point along the travel on the post 12 and is not limited to a number of finite preset positions. However, implementation of the two-spring design requires mechanical complexity in the form of added spring-loaded mechanisms. The part count and assembly of such an arrangement is high. Furthermore, the present invention analyzes how the spring mechanisms rely on unnecessary and contradictory forces that overconstrain the system. This unnecessary constraints must be overcome to move the arm/head, requiring added complexity in adjustment systems.

To move the arm/head assembly, a rotating cog or gear on the head interacts with a column of gear teeth mounted on the post. The user rotates the cog by turning a knob. Since the knob must overcome considerable friction (from the overconstraint discussed below) and must not release independently, the resistance of the knob is usually set to require a moderate to heavy twisting force to be advanced, which places strain on the user. Therefore, gross adjustments are tedious and require some amount of time and effort from the user.

The need remains for an OHP having a user-friendly head/arm assembly adjustment system. Preferably, such a system would offer ease of assembly and manufacture, cost-effectiveness, and reliability.

SUMMARY OF THE INVENTION

The present invention is directed to an overhead projector comprising a stage assembly and a post extending from the stage assembly. The stage assembly includes a main body and a stage, generally in the form of a glass and Fresnel lens stack.

The OHP further includes an optical projection head assembly suspended above the stage assembly by the post in a cantilever arrangement, the optical head assembly having a weight W. The head assembly includes a post retaining assembly having a collar fitted around the post, the collar having at least two friction points interacting with the post, the interaction having a coefficient of friction $\mu$. The weight W and the cantilever arrangement create torsional forces, the at least two friction points being positioned to transmit the torsional forces onto the post creating a friction force $F_f$.

The coefficient of friction of the interaction between each of the at least two friction points and the post is selected such that absent other forces the friction force is at least sufficient to maintain the head assembly at a static position with respect to the post.

That is, the coefficient of friction of each interaction is selected such that the total friction force $F_f$ meets the following condition:

$$F_f \geq W.$$

In an embodiment, the at least two friction points include two friction pads, wherein the two friction pads are each positioned on opposite sides of the post and are spaced from each other a vertical distance L. Where the friction points have the same friction coefficient, L and $\mu$ are selected such that $$F_f = \mu\left(W\frac{(2D+d)L}{L^2+d^2}\right) \geq W$$

Where the friction points have different friction coefficients $\mu_{p1}$ and $\mu_{p2}$, L and values of the friction coefficients are selected such that $$F_f = \left[\mu_{p1}\left(W\frac{DL}{L^2+d^2}\right) + \mu_{p2}\left(W\frac{(D+d)L}{L^2+d^2}\right)\right] \geq W$$

In one embodiment, at least one of the friction points may be removed from contact with the post to allow movement of the head assembly to a different position along the post. An adjustment mechanism allows the user to move the head assembly to a different position along the post comprises a gear and rack system. Alternatively, the adjustment mechanism that allows the user to move the head assembly to a different position along the post comprises a friction mechanism.

In yet another embodiment, the adjustment mechanism allows the user to move the head assembly to a different position along the post, wherein the torsional force on at least one of the friction points is reduced during movement. The friction mechanism may be mounted on at least one of the friction points.

The overhead projector may further comprise a spring that loads at least one of the existing friction points in the same rotational direction as the torsional force created by the weight W thereby increasing the frictional force. Where the friction points have different friction coefficients $\mu_{p1}$ and $\mu_{p2}$, L and values of the friction coefficients are selected such that $$F_f = \mu_{p1}\left(W\frac{DL}{L^2+d^2} + F_s \cdot \frac{(L+h)L}{L^2+d^2}\right) + \mu_{p2}\left(W\frac{(D+d)L}{L^2+d^2} + F_s \cdot \frac{hL}{L^2+d^2}\right)$$

where $$F_f \geq W.$$

The spring may be used to load an additional friction point. Then, where the friction points have different friction coefficients $\mu_{p1}$ and $\mu_{p2}$ and the additional friction point has a coefficient of friction $\mu_s$, L and the values of the friction coefficients are selected such that $$F_f = \mu_{p1}\left(W\frac{DL}{L^2+d^2} + F_s \cdot \frac{(L+h)L}{L^2+d^2}\right) +$$
$$\mu_{p2}\left(W\frac{(D+d)L}{L^2+d^2} + F_s \cdot \frac{hL}{L^2+d^2}\right) + \mu_s \cdot F_s$$

The at least two friction points comprise two friction pads placed near opposite ends and at opposite sides of the collar, and the spring loaded friction pad is placed in a location not between the friction pads.

The present invention also contemplates an adjustable attachment mechanism for an overhead projector, the overhead projector comprising a post extending from a main body supporting a cantilevered weight W. The attachment mechanism includes a post retaining assembly having a collar fitted around the post, the collar having at least two friction points interacting with the post, the interaction having a coefficient of friction. The weight W and the cantilever arrangement create torsional forces, the at least two friction points being positioned to transmit the torsional forces onto the post creating a friction force $F_f$. The coefficient of friction of the interaction between each of the at least two friction points and the post is selected such that absent other forces the friction force is at least sufficient to maintain the head assembly at a static position with respect to the post.

DETAILED DESCRIPTION OF THE INVENTION

Figure 1:
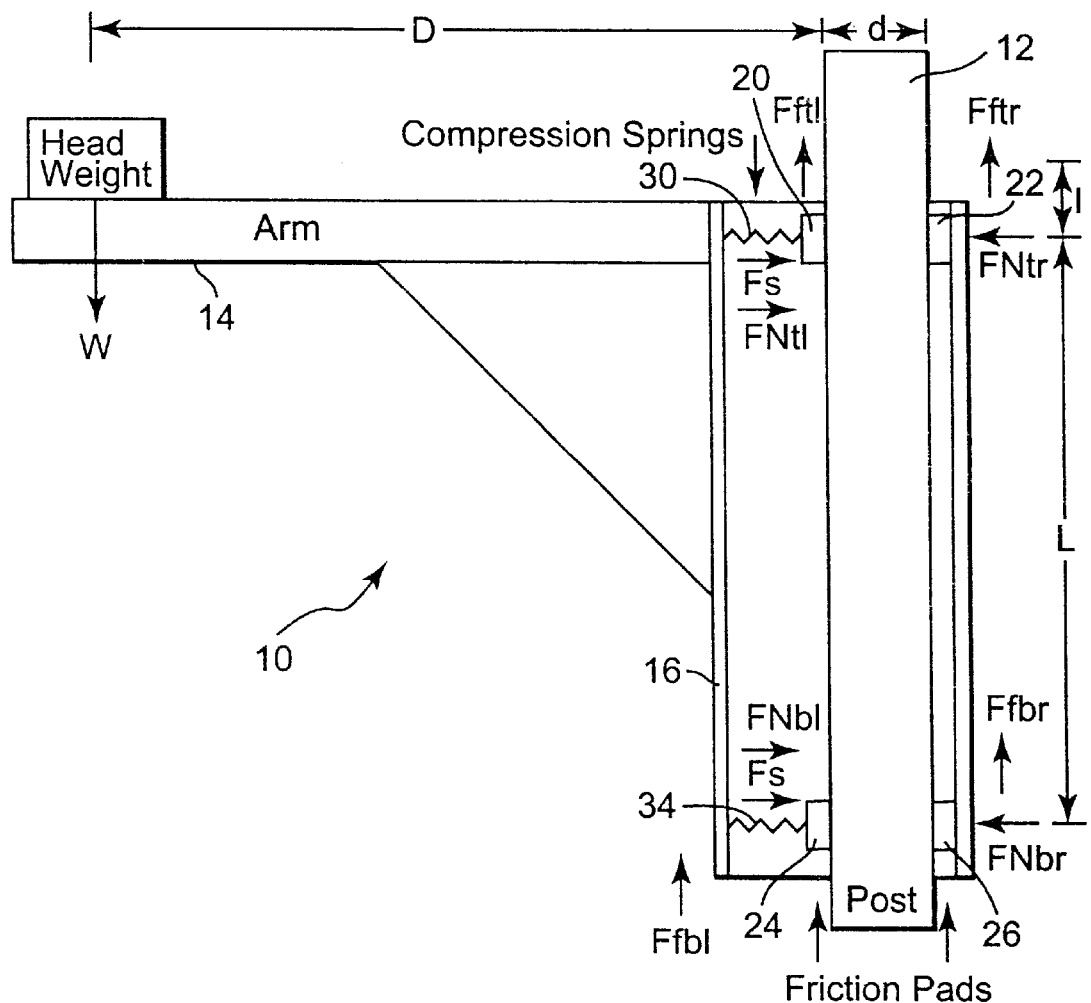
FIG. 1 is a side elevation view of a schematic representation of a prior art two-spring system.

Referring back to FIG. 1, friction pads 20 and 24 are spring loaded by springs 30 and 34 and exert pressure opposite pads 22 and 26 respectively. The spring forces are identified as $Fs_1$ and $Fs_2$ respectively. At first glance, it may be assumed that the springs 30 and 34 are used to set the "normal" force on the friction pads 20 and 24. However, the first job of the spring 24 at the bottom/left is to prevent the head weight from rotating the post mount. The force needed just to bring the bottom/right (br) friction pad 26 into contact with the post 12 is determined by a torque balance equation. The required torque force for the two-spring system ($S_2$) is:

$$TorqueFs_2 = W\frac{(D+d)L}{L^2+d^2} \quad (1)$$

where W is the weight of the head/arm assembly, D is the distance from the head weight W to the post, d is the post width, and L is the distance between the top and bottom pads. It is common to add additional force to the spring to load the friction pad 26 at bottom/right. A reasonable design would allow the user to adjust the projection mirror without rotating the post mount. The total spring force then becomes $$Fs_2 = Incr + W\frac{(D+d)L}{L^2+d^2} \quad (2)$$

where Incr is the incremental increase in spring force. Since the bottom/right friction pad 26 is opposite the bottom/left (bl) pad 24 and it had no force prior to increasing the spring force, the "normal" force on the bottom/right pad (br) 26 is now $$FN_{br} = Incr \quad (3)$$

In the two-spring design 10, the spring force is generally set the same in both springs to simplify the design. The spring 30 at the top/left (tl) provides the same force on the top/left friction pad 20 as the spring 34 at the bottom/left puts on pad 24.

The weight W of the cantilevered projection head/arm loads the friction pad 22 at top/right (tr) in FIG. 1. The torque balance equation is used to determine the force on this friction pad in the absence of the spring force on the top/left friction pad.

$$W\frac{DL}{L^2+d^2} \quad (4)$$

Adding the spring force brings the "normal" force on the friction pad 22 at top/right to $$FN_{tr} = Incr + W \frac{(2D+d)L}{L^2 + d^2} \quad (5)$$

Now that we have the "normal" forces on all pads, we can calculate the total frictional force $F_f$. The frictional force equation is $$F_f = \mu \cdot FN \quad (6)$$

where $\mu$ is the coefficient of friction between the friction pad and the post, and FN is the force "normal" to the pad-to-post interface. Notice that the area of the friction pad is not part of this equation. In fact, the area of the friction pad is not important as long as one surface does not damage the other.

In the two-spring design, it is common to use different materials for the left and right friction pads. This is indicated by a subscript on the coefficient of friction. Substituting equations 2, 3 and 5 into equation 6 and allowing for the different materials, yields the total frictional force available in the post mount.

$$F_f = \mu_l \left( 2Incr + 2W \frac{(D+d)L}{L^2+d^2} \right) + \mu_r \left( 2Incr + W \frac{(2D+d)L}{L^2+d^2} \right) \quad (7)$$

where $\mu l$ is the coefficient of friction for the left pads on the post and $\mu r$ is the right coefficient of friction for the right pads on the post.

As can be seen from the above equations, the two-spring design severely overconstrains the system. The springs work against the natural cantilever force exerted by weight W. Movement of the head/arm assembly requires either that the friction pads be disengaged or significant upward or downward force to overcome the total frictional force $F_f$. As discussed, the added complexity increases part count, costs and manufacturing time.

Figure 2:
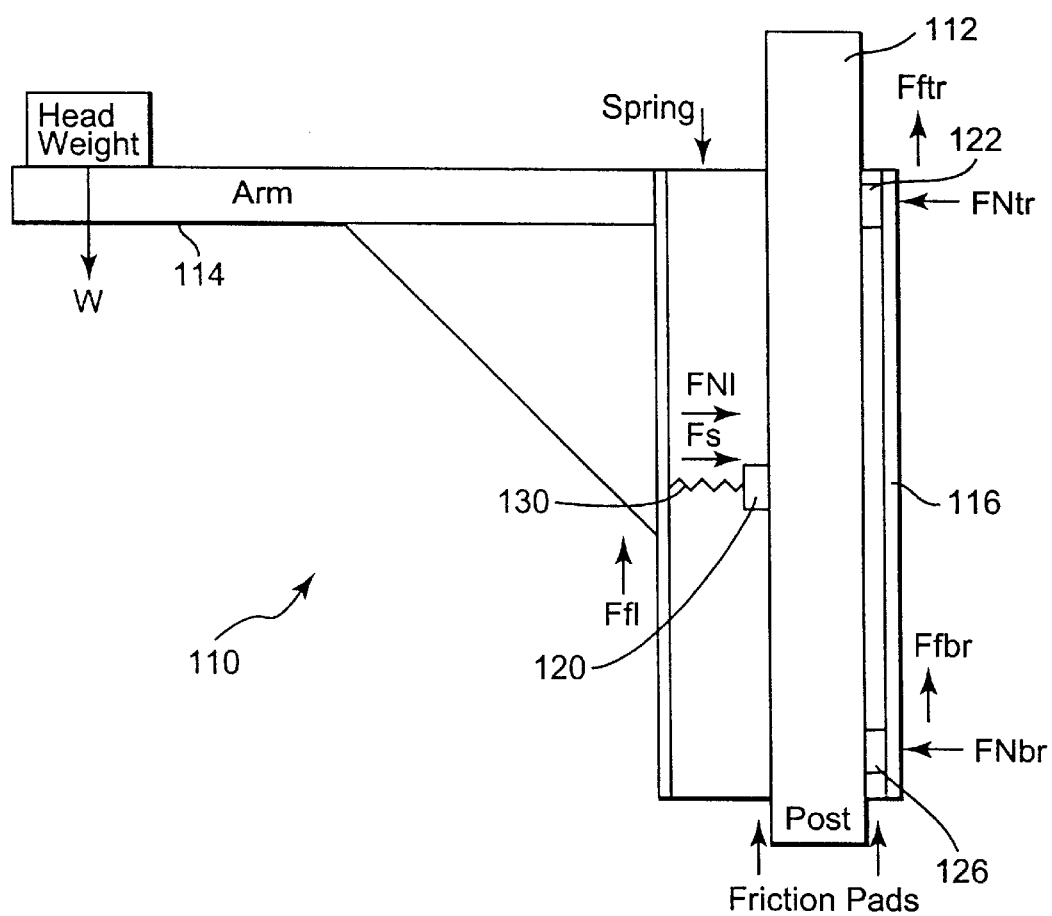
FIG. 2 is a side elevation view of a schematic representation of a prior art one-spring system.

An alternate design 110, illustrated in FIG. 2, uses a single spring 130 near the middle of collar 116 to retain arm 114 to post 112. However, the retaining system is still performing the same functions as above. It must first counter the torque caused by the weight W of the cantilevered head. Then it must provide loading for the bottom/right friction pad 126. For simplified comparison, the friction pad 120 on the left is half way between the two friction pads on the right, although it could be placed at other locations.

The single spring 130 in the one-spring design actually has to be roughly two times stronger to cancel the head weight W because it is working at half the distance compared to the two-spring design. In addition, the incremental increase in spring force to load the bottom/right friction pad the same as in the two-spring design must be two times larger also. The spring force becomes $$F_s = 2Incr + 2W \frac{(D+d)L}{L^2 + (2d)^2} \quad (8)$$

where Incr is the same as the two-spring design and so 2Incr shows the two times effect directly.

In some one-spring designs, the spring force is applied through the gear to the rack. Therefore, the coefficient of friction of the left pad is likely to be different from the right pads. Using the notation used in equation 7, the resulting frictional force available in the one-spring design for the post mount mechanism becomes $$F_f = \mu_l \left( 2Incr + 2W \frac{(D+d)L}{L^2 + (2d)^2} \right) + \mu_r \left( 2Incr + 2W \frac{DL}{L^2 + (2d)^2} \right) \quad (9)$$

In the case, where d goes to zero, equations 7 and 9 become the same. For parameters that are more common, the frictional force for the 1-spring design is somewhat smaller than the two-spring design.

Figure 3:
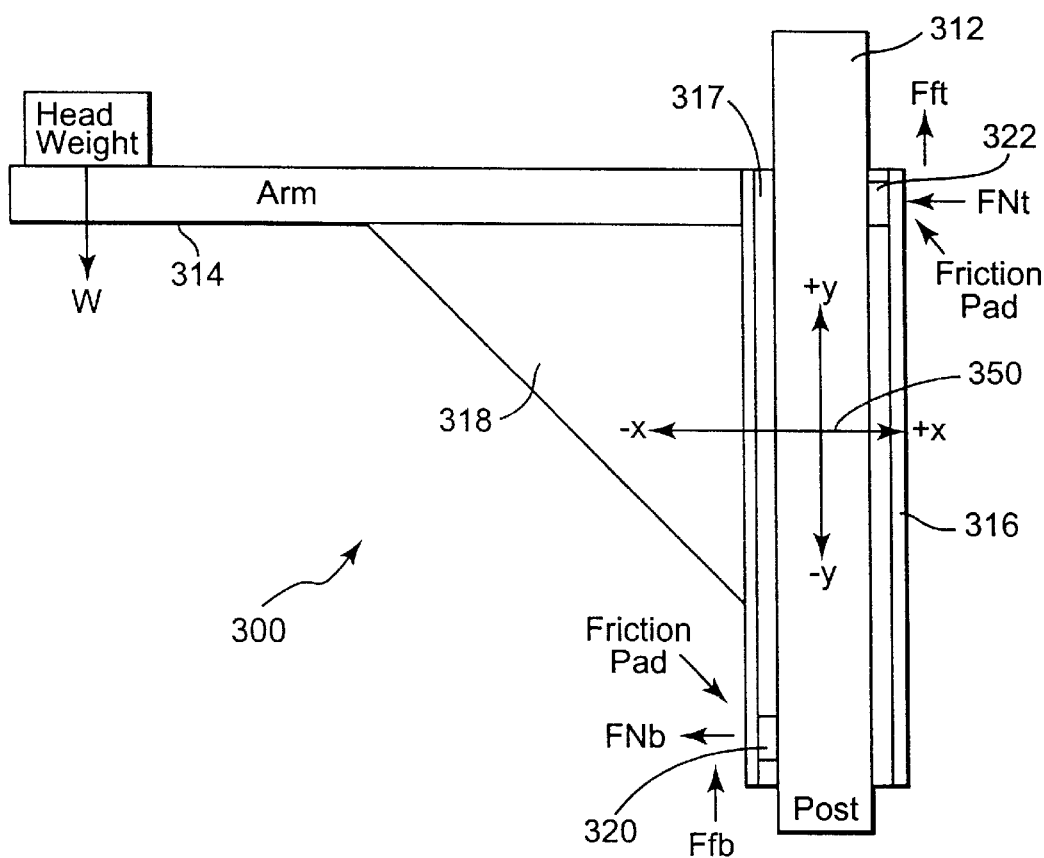
FIG. 3 is a side elevation view of a schematic representation of a portion of a first embodiment of an overhead projector in accordance with the present invention.

FIG. 3 illustrates a first embodiment of an OHP 300 in accordance with the present invention. The OHP 300 uses only the cantilever loading from the head/arm assembly to load the friction pads. The system is easy to manufacture, having a reduced amount of parts. The system also is easy to adjust and is not limited to a number of preset locations.

OHP 300 includes a vertical post 312 and an arm 314 holding a projection head (not shown) at a distal end. The arm 314 includes a hollow collar 316 joined to a proximal end of the arm 312. The collar can be round, C-shaped, rectangular shaped or other shapes that provide the necessary torsional points upon the post. A brace element 318 further supports and couples the collar 316 to the rest of the arm 314. The collar 316 defines an inner cavity 317 that surrounds a portion of the post 312. Note how the inner width of the cavity 317 is narrower than that of the collar in the OHP illustrated in FIG. 2.

The weight of the arm/head assembly is illustrated as a force W placed at the center of gravity for the arm/head assembly. The torque and friction forces are illustrated as arrows.

Inside the inner cavity 317, two spaced friction pads 320 and 322 are placed at opposite sides of the post 312. Again, it must be understood that alternative embodiments may use a plurality of pads to distribute the force points shown in the figures. Accordingly, the term friction point is meant to include various combinations or designs of single or plural pads that translate force as indicated. The post 312 is an aluminum or steel tube having a square or rectangular cross-section to afford a flat contact surface for the pads 320 and 322. Further, the outer surfaces of the post 312 may be treated, such as by anodizing, painting, acid etching, polishing, or by coating, to afford a surface having the desired frictional characteristics. Alternative embodiments may include a variety of post designs, materials and surface treatments.

The architecture illustrated in FIG. 3 relies on a much simplified arm retaining mechanism. Rather than fight the torsional forces exerted by the lever effect of the head mounted on the arm, the cantilevered projection head is used to provide sufficient force on friction pads to support the arm/head assembly.

As may be appreciated, the weight W exerts a torsional force on the collar 316. Setting either friction pad 320 or 322 as the pivot point or fulcrum, the weight W creates a counter clockwise torsional force. The post creates a clockwise torsional force against the non-pivot point friction pad. That is, if friction pad 320 is set as the pivot point then the post applies clockwise normal force to friction pad 322 to oppose the torque created by the weight W. Likewise, if 322 is set as the pivot point then the post applies clockwise torsional force to friction pad 320.

For this invention, the frictional force available in the post mount area, assuming a same coefficient of friction $\mu$ for both pads, is as follows $$F_f = \mu\left(W\frac{(2D+d)L}{L^2+d^2}\right) \quad (10)$$

For a system having friction pads having different coefficients of friction $\mu_{p1}$ and $\mu_{p2}$, the equation (10) translates to:

$$F_f = \mu_{p1}\left(W\frac{DL}{L^2+d^2}\right) + \mu_{p2}\left(W\frac{(D+d)L}{L^2+d^2}\right)_s \quad (11)$$

Variables D, d, and L are defined with respect to FIG. 1. Accordingly, the weight W exerts torsional forces on pads 320 and 322. The "normal" force applied to the friction pads is determined by a torque balance equation. More or less friction can be provided by changing the friction pad material or changing the distance between the friction points. Using equations (1) and (10) above, it is fairly straight forward to calculate the minimum friction coefficient $\mu$ necessary to hold a head/arm assembly of weight W and known lever arm distance D and distance between the friction pads L.

$$F_f \geq W \quad (12)$$

A careful designer will account for different kinetic and static coefficients of friction and insure that the actual value of $F_f$ exceeds the minimum.

It should be noted that there are small additional forces that oppose or add to the weight force W that are related to the finite size of the post. If the friction pad to post interfaces were vertically alligned as in the case of the curved post shown in FIG. 8, this small force would be zero. In most cases these additional forces are negligible and are therefore not accounted for in the equations.

Once materials having the correct values for $\mu$ are selected and a suitable distance between friction pads is selected, the head arm assembly will remain in the desired position. To move the arm/head assembly a user merely has to release the cantilever weight by lifting the head. This releases the contact between the friction pads 320 and 322 and the post 312. The user can then lift or lower the head/arm assembly to a desired position. Once the position is reached, the user releases the weight W, the frictional contact between the pads and the post is renewed, and the position of the head/arm assembly is set.

The narrow configuration of the internal cavity 317 reduces the amount of torsional travel allowed, thus reducing the difference between the loaded or unloaded positions of the head. This allows for more precise adjustment. In alternative embodiments, the collar 316 may be wider and détentes used to control the angular range of motion. In still other embodiments, where precise adjustment is not required (such as when the arm is shorter or the focus less sensitive), a larger range of angular travel may be allowed.

Figure 4:
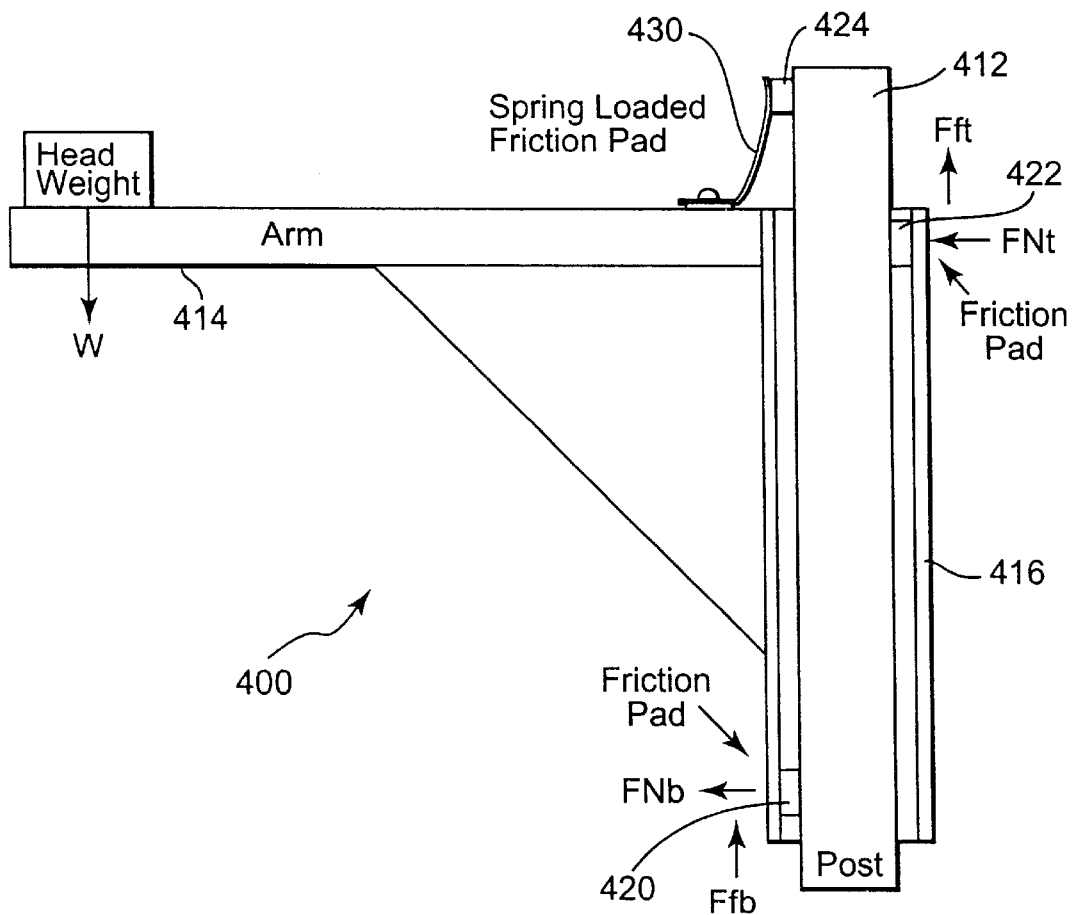
FIG. 4 is a side elevation view of a schematic representation of a portion of a second embodiment of an overhead projector in accordance with the present invention.
Figure 5:
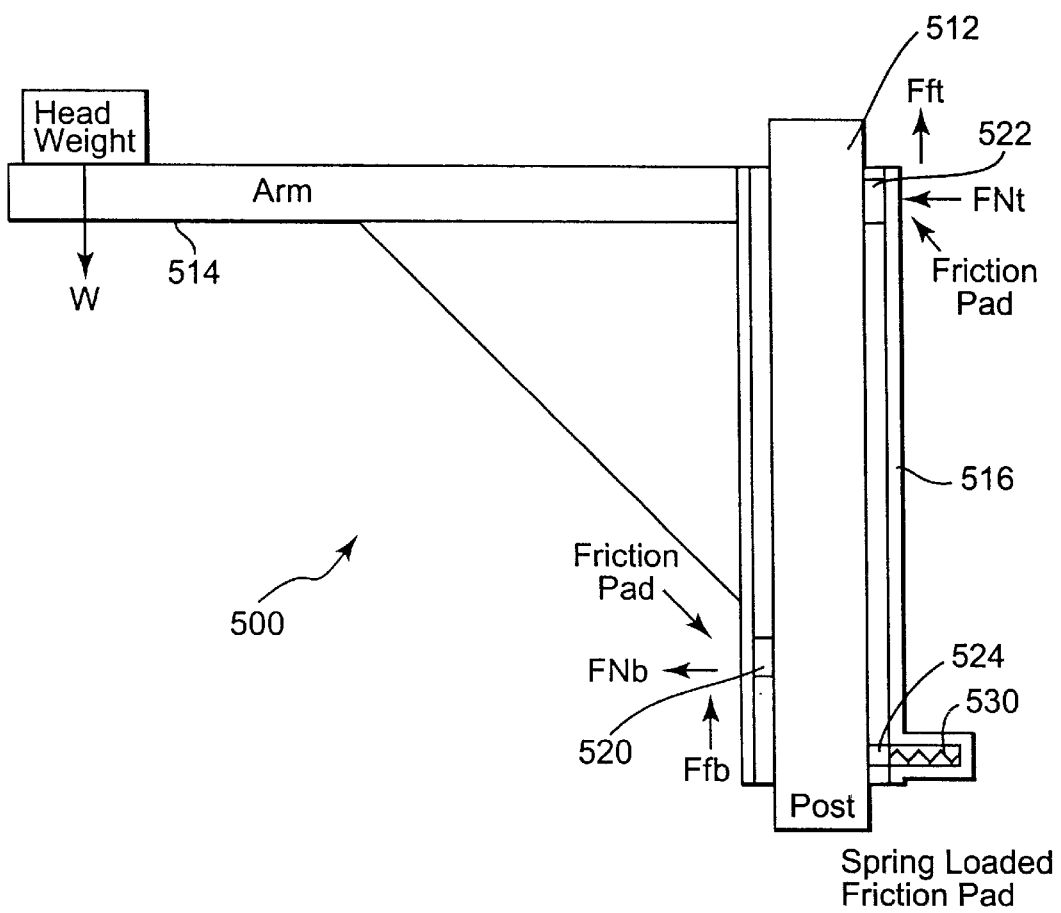
FIG. 5 is a side elevation view of a schematic representation of a portion of a third embodiment of an overhead projector in accordance with the present invention.

FIGS. 4 and 5 illustrate a second and a third embodiment, 400 and 500 respectively, of the present invention. Similar components to the embodiment illustrated in FIG. 3 are labeled using a reference numeral having the same last two digits as its counterpart. During testing, it was discovered that, because of the difference between static and kinetic coefficients of friction, when the OHP was adjusted the head would bounce or chatter. Also, if the OHP or head was bumped or subjected to kinetic shock or movement, the arm would sometimes move down on its own in a jerky motion (chatter). Friction pads 424 and 524 loaded by springs 430 and 530 respectively are set to increase the frictional force. The spring-loaded pads are preferably placed in a manner to create a torsional force in a rotational direction that increases the loading forces exerted by the weight W. In accordance with the present invention, the spring loaded pads are placed on the side of the posts 412 and 512 where they complement, not oppose, the cantilever effect of the arm/head assembly.

It may be desirable to use a different pad with the anti-chatter spring than is used on the other two friction pads. Allowing for different friction pad materials, the frictional force available in the post mount becomes $$F_f = \mu_p\left(W\frac{(2D+d)L}{L^2+d^2} + F_s \cdot \frac{(L+2h)L}{L^2+d^2}\right) + \mu_s \cdot F_s \quad (13)$$

For a system having friction pads having different coefficients of friction $\mu_{p1}$ and $\mu_{p2}$, the equation (13) translates to:

$$F_f = \mu_{p1}\left(W\frac{DL}{L^2+d^2} + F_s \cdot \frac{(L+h)L}{L^2+d^2}\right) + \mu_{p2}\left(W\frac{(D+d)L}{L^2+d^2} + F_s \cdot \frac{hL}{L^2+d^2}\right) + \mu_s \cdot F_s \quad (14)$$

Unlike the prior art, if the springs 430 or 530 in FIG. 4 or 5 are removed the post mount still works because of the cantilever. In the torque balance equation, the spring acts with the same sign as the head. That is the spring adds to the torque caused by the head. Therefore, as an alternative to FIG. 4, the spring and pad could be on the right side below the bottom/left pad as in FIG. 5. The spring force is selected to create a stable post mount under vibration, accidental impact and adjustment. The spring-loaded pads maintain loading of the post mount when the head bounces. This also prevents the friction pads from unloading when the head is bumped.

It should be noted that although the above generalized discussion has been for friction pads on opposite sides of a square or rectangular post, the invention and analysis can be done for pads on opposite corners of such posts. The invention will work for variety of post cross sections such as: round, oval, triangular, hexagonal, octagonal, etc. As long as offset pads can be placed on either side of the post, the invention will work as described.

Figure 6:
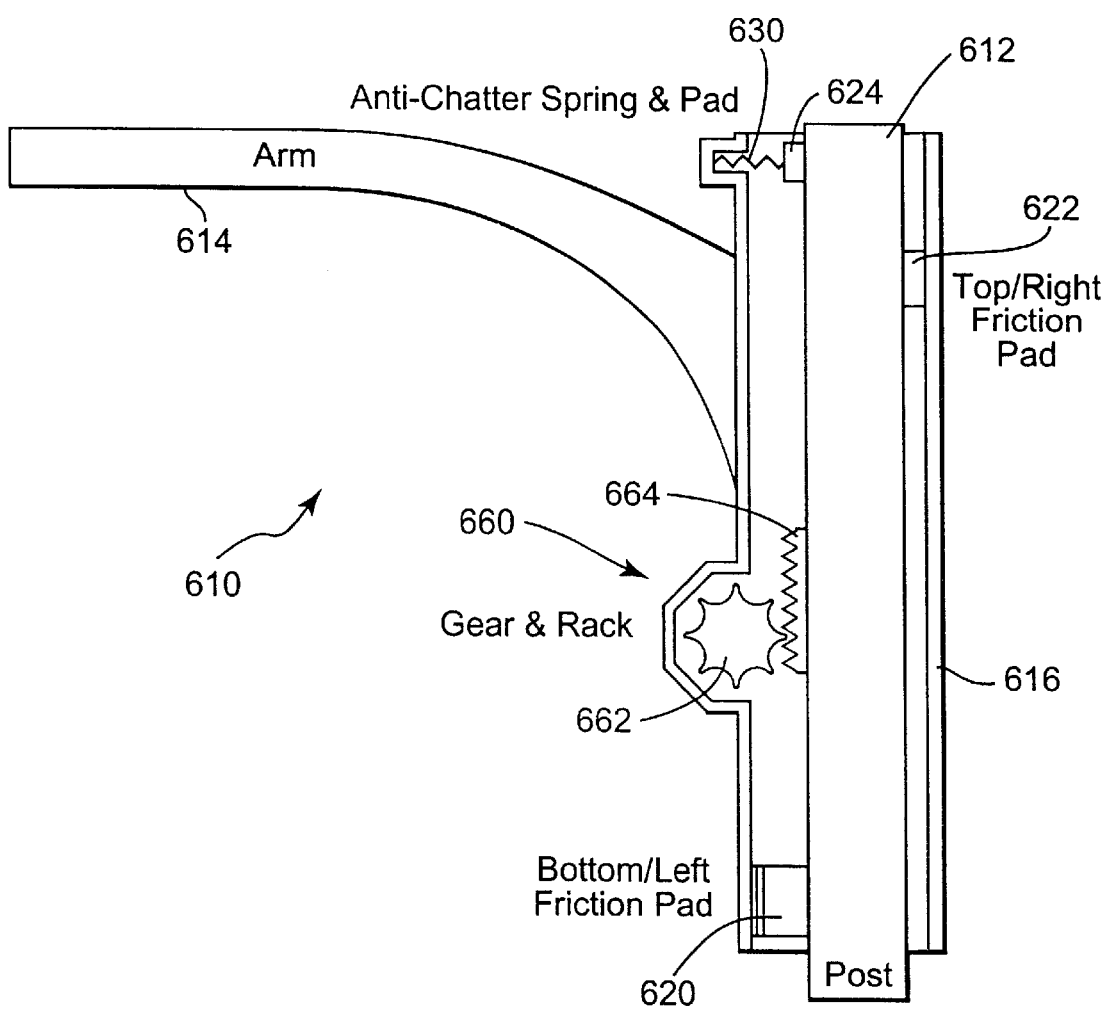
FIG. 6 is a side elevation view of a schematic representation of a portion of a fourth embodiment of an overhead projector in accordance with the present invention.
Figure 7:
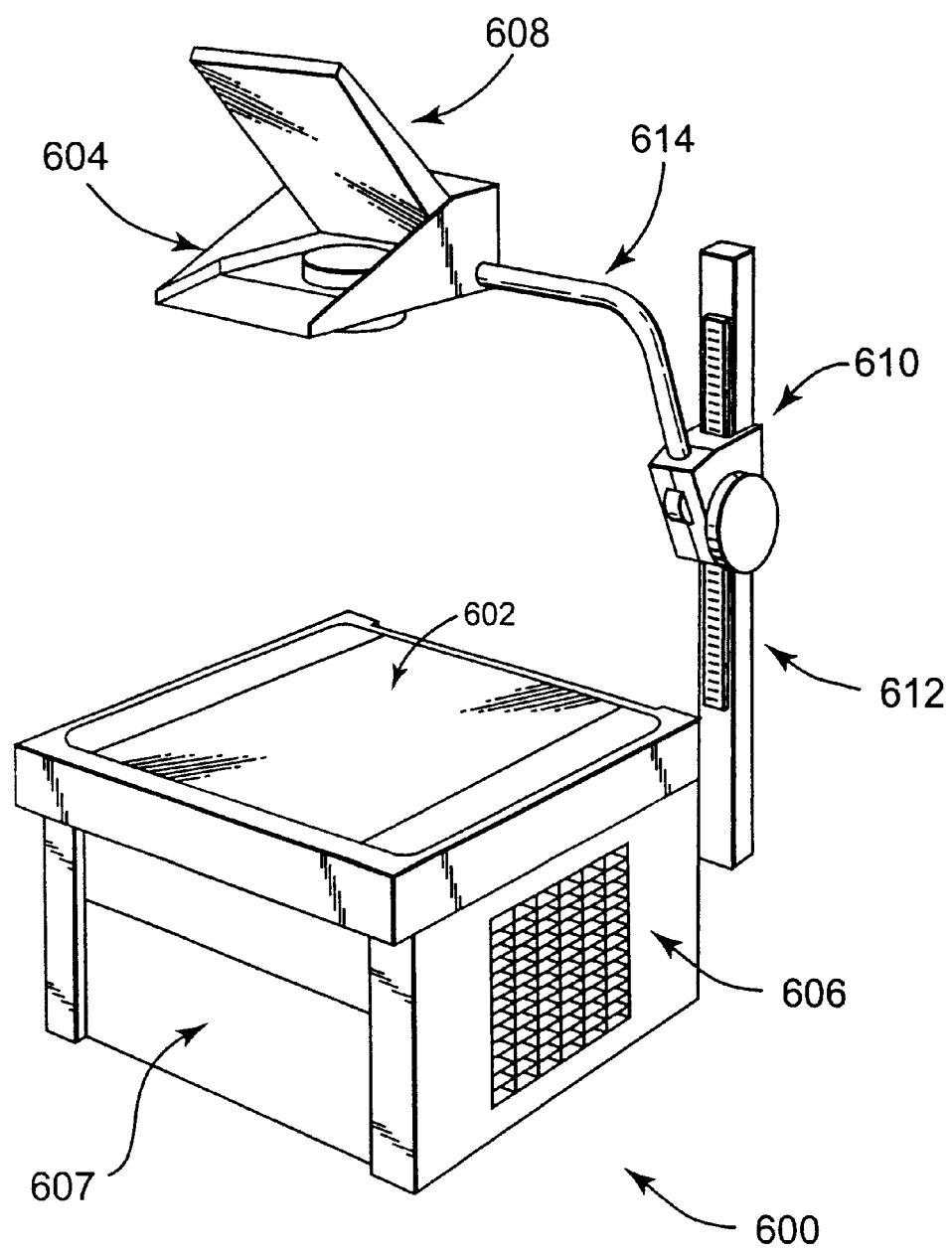
FIG. 7 is a perspective view of an overhead projector in accordance with the present invention.
Figure 8:
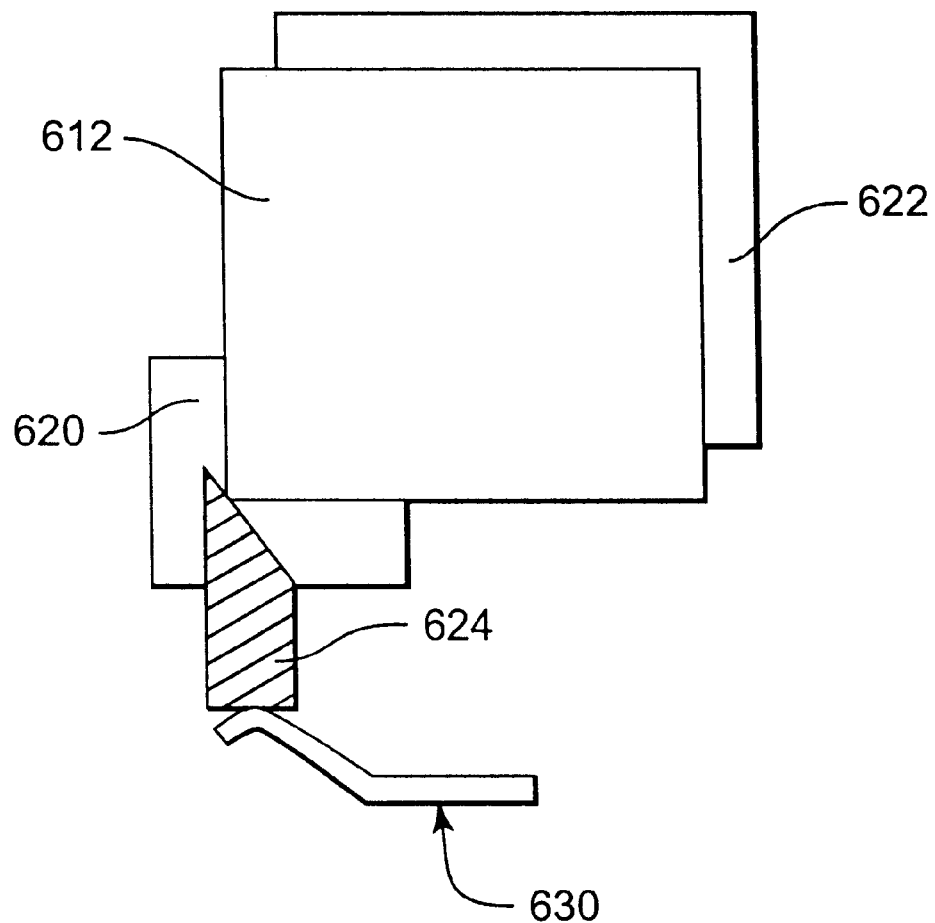
FIG. 8 is a cross-sectional plan view of the collar of the OHP embodiment illustrated in FIG. 7.

FIGS. 6, 7 and 8 show generalized diagrams of another embodiment 600 of the present invention. FIG. 6 shows a detail view of the post retaining assembly, while FIG. 7 shows a generalized view of the entire OHP 600. FIG. 8 is a cross-sectional plan view of the post that illustrates how the friction pads may be placed on opposite corners of a square cross section post. The post 612 of OHP 600 is located at the corner of the stage area assembly 602. The stage area assembly includes a glass stage and a main body. The projection lens 604 is located above the center of the stage area 602 and is connected to the post 612 by an arm 614. The post 612 is located at one corner of the stage area assembly 602. The post has a square cross section with one face of the post 612 mounted parallel to the side 606 of the main body of the OHP 600. The cantilevered projection head 608 is supported in the post mount area 610 by placing the bottom/left friction pad 620 on the corner-edge of the post nearest the stage area 602 and near the bottom of the post mount 610. The top/right friction pad 622 is placed on the corner-edge of the post 612 opposite the stage area near the top of the post mount assembly 610 and above the bottom/left pad. The anti-chatter spring 630 and loaded pad 624 is placed on a corner-edge of the post 612 nearest the stage area 602 near the top of the post mount 610 and above the top/right pad 622.

The anti-chatter spring 630 and pad 624 may be located at or above the top/right friction pad 622 and on the opposite side to it. Alternatively, the anti-chatter spring 630 and pad 624 may be located at or below the bottom/left friction pad 620 and on the opposite side to it. In these configurations, the post mount mechanism 610 remains stable when the cantilever load is momentarily removed by bumping or adjustment.

In OHP 600 a gear and rack mechanism 660 is placed between the top/right pad 622 and bottom/left pad 620 on a face of the post 612 perpendicular to the side 606 of the OHP 600 and nearest the front 607 of the OHP 600. The gear and rack mechanism 660 includes a gear 662 having teeth that interact with a rack 664. The gear 662 is loosely held and does not put pressure on the either the rack 664 or the post 612. In OHP 600, the friction pads 620, 622, and 624 maintain contact with the post 612. The gear and rack mechanism 660 is used to overcome the friction force when adjustment of the head/arm assembly is desired.

The gear and rack mechanism 660 may be located anywhere on the collar 616. Since the gear and rack mechanism 660 is not a loading member, it could be above or below either friction pad and on any side of the post 612. It could be located perpendicular or out of the plane of the cantilever load and friction pads. It could even be located at one of the friction pads. One concept uses a spring-loaded gear with friction built into the gear holder as the anti-chatter spring and pad. The gear and rack/anti-chatter adjustment mechanism could be placed anywhere the anti-chatter spring and pad could be positioned.

The adjustment system could be just a push system with no knob of any kind. The post mount area would be pushed either up or down for adjustment. It also could be a friction wheel in contact with the post. Such as friction system would need to be positioned carefully. It could be used as the anti-chatter spring and pad. It also could be placed opposite one of the friction pads. The loading of the friction wheel would increase the friction pad loading. It also could be built into one of the friction pads.

Figure 9:
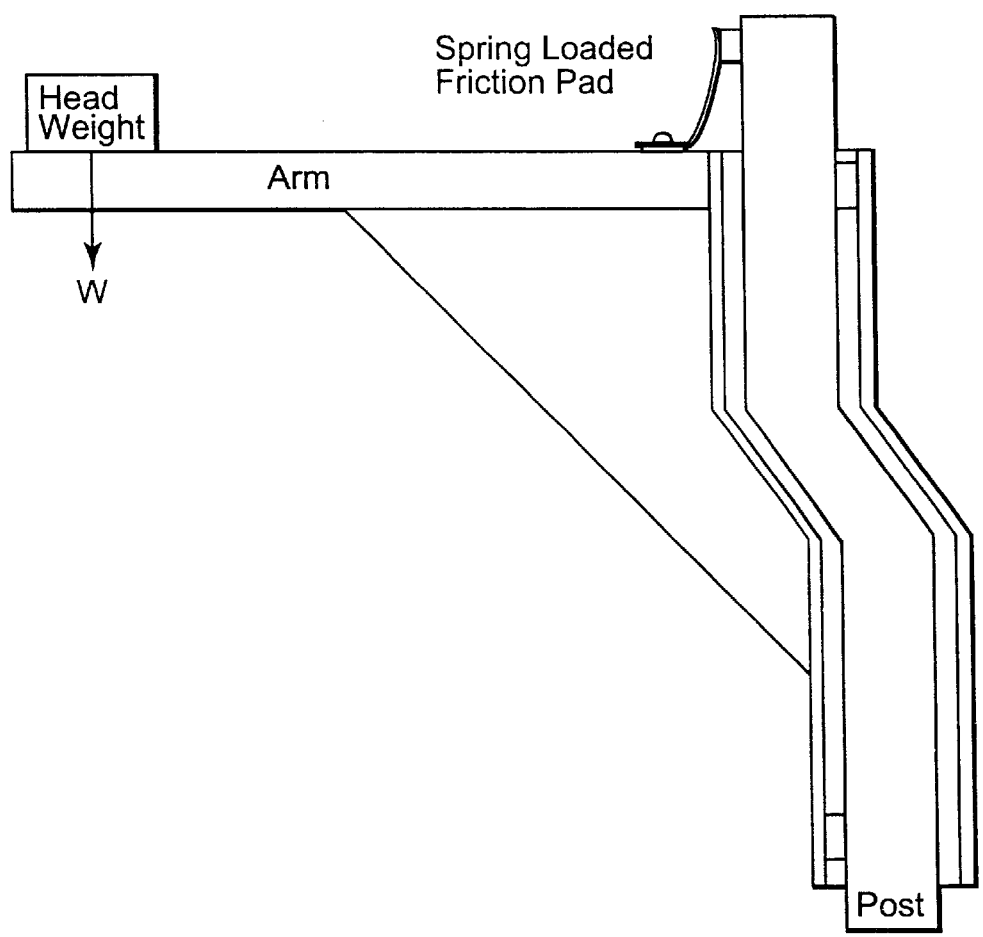
FIG. 9 is a side elevation view of a curved post OHP embodiment in accordance with the present invention.

The post does not have to be straight. The post could be curved between the top and bottom pads, as illustrated in FIG. 9. As long as the friction pads are located in an area where they can slide to adjust the height of the projection head and they are loaded by the cantilevered projection head.

Those skilled in the art will appreciate that the present invention may be used in a variety of different overhead projector architectures. While the present invention has been described with a reference to exemplary preferred embodiments, the invention may be embodied in other specific forms. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. An overhead projector comprising:
   a) a stage assembly;
   b) a post extending from the stage assembly;
   c) an optical projection head assembly suspended above the stage assembly by the post in a cantilever arrangement, the optical head assembly having a weight W;
   d) wherein the head assembly includes a post retaining assembly having a collar fitted around the post, the collar having at least two friction points interacting with the post, the interaction having a coefficient of friction $\mu$;
   e) wherein the weight W and the cantilever arrangement create torsional forces, the at least two friction points being positioned to transmit the torsional forces onto the post creating a friction force $F_f$; and
   f) wherein the coefficient of friction of the interaction between each of the at least two friction points and the post is selected such that absent other forces the friction force is at least sufficient to maintain the head assembly at a static position with respect to the post.

2. The overhead projector of claim 1, wherein the coefficient of friction of each interaction is selected such that:

$$F_f \geq W.$$

3. The overhead projector of claim 1, wherein the at least two friction points include two friction pads, wherein the two friction pads are each positioned on opposite sides of the post and are spaced from each other a vertical distance L.

4. The overhead projector of claim 3, wherein the friction points have the same friction coefficient and where L and $\mu$ are selected such that $$F_f = \mu\left(W \frac{(2D+d)L}{L^2 + d^2}\right) \geq W$$

5. The overhead projector of claim 3, wherein the friction points have different friction coefficients $\mu_{p1}$ and $\mu_{p2}$ and where L and values of the friction coefficients are selected such that $$F_f = \left[\mu_{p1}\left(W \frac{DL}{L^2 + d^2}\right) + \mu_{p2}\left(W \frac{(D+d)L}{L^2 + d^2}\right)\right] \geq W$$

6. The overhead projector of claim 1, wherein at least one of the friction points may be removed from contact with the post to allow movement of the head assembly to a different position along the post.

7. The overhead projector of claim 6, further comprising an adjustment mechanism that allows the user to move the head assembly to a different position along the post comprising a gear and rack system.

8. The overhead projector of claim 6, further comprising an adjustment mechanism that allows the user to move the head assembly to a different position along the post comprising a friction mechanism.

9. The overhead projector of claim 1, further comprising an adjustment mechanism that allows the user to move the head assembly to a different position along the post, wherein the torsional force on at least one of the friction points is reduced during movement.

10. The overhead projector of claim 9, wherein the adjustment mechanism comprises a gear and rack system.

11. The overhead projector of claim 9, wherein the adjustment mechanism comprises a friction mechanism.

12. The overhead projector of claim 11, wherein the friction mechanism is mounted on at least one of the friction points.

13. The overhead projector of claim 1, further comprising a spring that loads at least one of the friction points in the same rotational direction as the torsional force created by the weight W thereby increasing the total frictional force.

14. The overhead projector of claim 13, wherein the friction points have different friction coefficients $\mu_{p1}$ and $\mu_{p2}$ and where L and values of the friction coefficients are selected such that $$F_f = \mu_{p1}\left(W\frac{DL}{L^2+d^2} + F_s \cdot \frac{(L+h)L}{L^2+d^2}\right) + \mu_{p2}\left(W\frac{(D+d)L}{L^2+d^2} + F_s \cdot \frac{hL}{L^2+d^2}\right),$$

where $$F_f \geq W.$$

15. The overhead projector of claim 13, wherein the spring loads an additional friction point.

16. The overhead projector of claim 15, wherein the friction points have different friction coefficients $\mu_{p1}$ and $\mu_{p2}$ and the additional friction point has a coefficient of friction $\mu_s$ where L and the values of the friction coefficients are selected such that $$F_f = \mu_{p1}\left(W\frac{DL}{L^2+d^2} + F_s \cdot \frac{(L+h)L}{L^2+d^2}\right) +$$
$$\mu_{p2}\left(W\frac{(D+d)L}{L^2+d^2} + F_s \cdot \frac{hL}{L^2+d^2}\right) + \mu_s \cdot F_s$$

17. The overhead projector of claim 13, wherein the at least two friction points comprise two friction pads placed near opposite ends and at opposite sides of the collar, and the spring loaded friction pad is placed in a location not between the friction pads.

18. An adjustable attachment mechanism for an overhead projector, the overhead projector comprising a post extending from a main body supporting a cantilevered weight W, the attachment mechanism comprising a) a post retaining assembly having a collar fitted around the post, the collar having at least two friction points interacting with the post, the interaction having a coefficient of friction;

b) wherein the weight W and the cantilever arrangement create torsional forces, the at least two friction points being positioned to transmit the torsional forces onto the post creating a friction force $F_f$, and c) wherein the coefficient of friction of the interaction between each of the at least two friction points and the post is selected such that absent other forces the friction force is at least sufficient to maintain the head assembly at a static position with respect to the post.

* * * * *